(12) United States Patent
Hashimoto et al.

(10) Patent No.: US 11,018,564 B2
(45) Date of Patent: May 25, 2021

(54) METHOD FOR FORMING COIL AND APPARATUS FOR FORMING COIL

(71) Applicant: AISIN AW CO., LTD., Anjo (JP)

(72) Inventors: Shingo Hashimoto, Okazaki (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 455 days.

(21) Appl. No.: 15/760,484

(22) PCT Filed: Sep. 16, 2016

(86) PCT No.: PCT/JP2016/077389
§ 371 (c)(1),
(2) Date: Nov. 13, 2018

(87) PCT Pub. No.: WO2017/057036
PCT Pub. Date: Apr. 6, 2017

(65) Prior Publication Data
US 2019/0074753 A1 Mar. 7, 2019

(30) Foreign Application Priority Data

Sep. 30, 2015 (JP) .............................. JP2015-194029

(51) Int. Cl.
*H02K 15/04* (2006.01)
*H02K 15/06* (2006.01)
*H02K 15/10* (2006.01)

(52) U.S. Cl.
CPC ....... *H02K 15/045* (2013.01); *H02K 15/0478* (2013.01); *H02K 15/065* (2013.01); *H02K 15/105* (2013.01)

(58) Field of Classification Search
CPC .. H02K 15/04; H02K 15/045; H02K 15/0478; H02K 15/065; H02K 15/105
See application file for complete search history.

(56) References Cited

U.S. PATENT DOCUMENTS 7,467,648 B2 * 12/2008 Hashimoto ........ H02K 15/0435
140/71 C
9,570,966 B2 * 2/2017 Hashimoto .......... H02K 15/045
(Continued)

FOREIGN PATENT DOCUMENTS

JP 2002010616 A * 1/2002 ............. H02K 41/02
JP 2004-297863 A 10/2004
(Continued)

OTHER PUBLICATIONS

Nov. 1, 2016 Search Report issued in International Patent Application No. PCT/JP2016/077389.

*Primary Examiner* — Peter Dungba Vo
*Assistant Examiner* — Jeffrey T Carley
(74) *Attorney, Agent, or Firm* — Oliff PLC

(57) ABSTRACT

A method for forming a coil that is formed by winding a flat rectangular conductor wire a plurality of times, the method includes forming, in the coil end portion, an offset portion bent in a stacking direction of the flat rectangular conductor wire with an offset in the stacking direction of the flat rectangular conductor wire by an amount corresponding to a width of the single flat rectangular conductor wire by moving the outer die on the one side in the divided outer die relative to the outer die on the other side in a direction along the stacking direction.

12 Claims, 12 Drawing Sheets

(56) References Cited

U.S. PATENT DOCUMENTS

| | | | | |
|---|---|---|---|---|
| 2005/0005422 A1* | 1/2005 | Kuroyanagi | ......... | H02K 15/066 |
| | | | | 29/596 |
| 2006/0179644 A1* | 8/2006 | Maruyama | ......... | H02K 15/0414 |
| | | | | 29/732 |
| 2012/0025658 A1* | 2/2012 | Watanabe | ............ | H02K 15/045 |
| | | | | 310/179 |
| 2012/0181891 A1* | 7/2012 | Yamada | ............... | H02K 15/066 |
| | | | | 310/201 |
| 2012/0319523 A1* | 12/2012 | Manabu | ............. | H02K 15/0464 |
| | | | | 310/201 |
| 2013/0140934 A1* | 6/2013 | Tanaka | .................... | H02K 3/28 |
| | | | | 310/198 |
| 2015/0288262 A1* | 10/2015 | Tsuiki | ................ | H02K 15/0421 |
| | | | | 29/605 |

FOREIGN PATENT DOCUMENTS

| | | |
|---|---|---|
| JP | 2013-251996 A | 12/2013 |
| JP | 2015-70761 A | 4/2015 |
| WO | 2014/050409 A1 | 4/2014 |
| WO | 2014/157218 A1 | 10/2014 |

\* cited by examiner

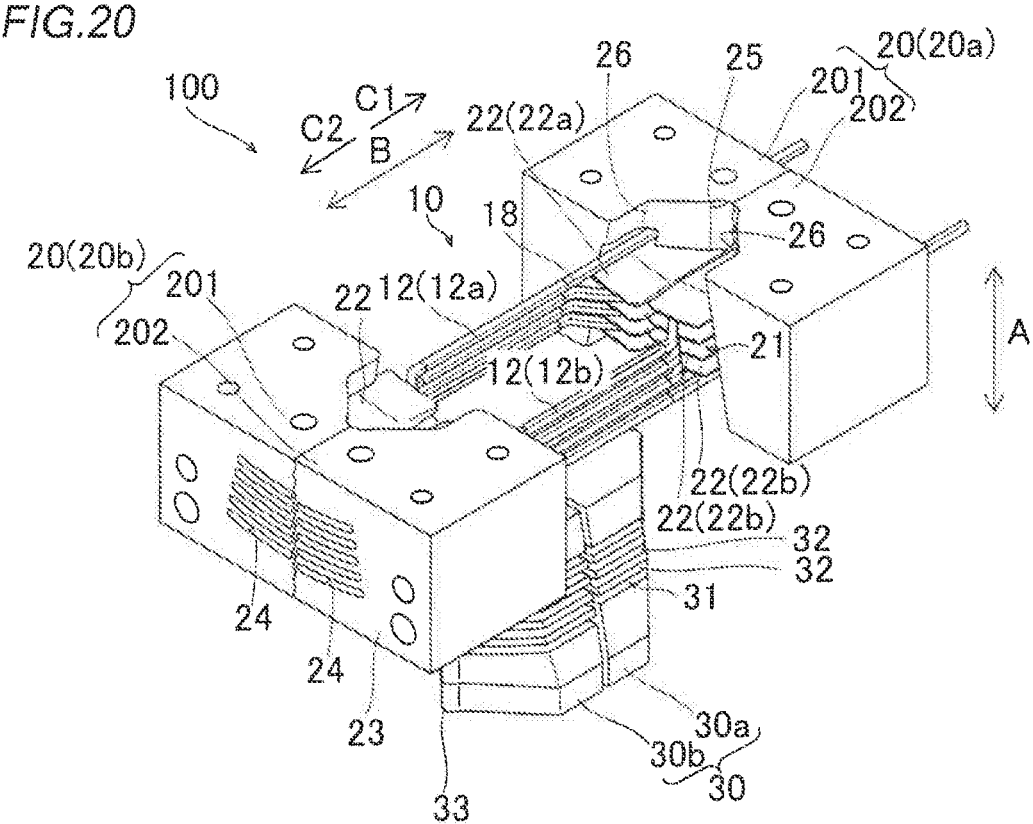

METHOD FOR FORMING COIL AND APPARATUS FOR FORMING COIL

BACKGROUND

The present disclosure relates to a method for forming a coil and an apparatus for forming a coil.

Hitherto, there are known a coil forming method and a coil forming apparatus for forming a coil end portion of a coil. The coil forming method and the coil forming apparatus are disclosed in, for example, International Publication No. 2014/157218 (WO 2014/157218) and Japanese Patent Application Publication No. 2004-297863 (JP 2004-297863 A).

International Publication No. 2014/157218 (WO 2014/157218) discloses a coil forming method for forming coil end portions of a concentric winding coil that is formed by winding a flat rectangular conductor wire a plurality of times. This coil forming method uses fin-shaped dies each including a plurality of fins, and the fins are arranged so as to have clearances therebetween in a stacking direction of stacked portions of the flat rectangular conductor wire of the concentric winding coil. The flat rectangular conductor wire that structures the coil end portions is arranged in the clearances between the fins of the fin-shaped dies. The fin-shaped dies are moved relative to the concentric winding coil so that the fin-shaped dies approach the concentric winding coil. Thus, the coil end portions of the concentric winding coil are deformed (formed) in conformity to the shape of the fins.

Specifically, each of the fins is formed into a circular arc shape in conformity to a circular arc of an annular stator core on which the concentric winding coil is arranged. The circular arc-shaped fins are divided so as to correspond to one side and the other side of a pair of slot-housed portions of the concentric winding coil to be housed in slots. The height positions of the fins on one side in the plurality of divided fins in the stacking direction of the flat rectangular conductor wire and the height positions of the fins on the other side in the plurality of divided fins in the stacking direction of the flat rectangular conductor wire are shifted from each other.

By moving the fin-shaped dies relative to the concentric winding coil, the coil end portions of the concentric winding coil are curved into a circular arc shape in conformity to the shape of the circular arc-shaped fins. Further, the coil end portions are pressed against the divided fins having the different height positions (pressures are applied to the coil end portions upward and downward in the stacking direction of the flat rectangular conductor wire) while relatively moving (sliding) the fin-shaped dies in the directions in which the fin-shaped dies approach the concentric winding coil. Thus, offset portions each bent in the stacking direction of the flat rectangular conductor wire (direction substantially orthogonal to the direction in which the concentric winding coil relatively moves) with an offset in the stacking direction by an amount corresponding to a predetermined width are formed in the coil end portions of the concentric winding coil. In this manner, the curving of the coil end portions of the concentric winding coil and the formation of the offset portions are performed in a single step. That is, in a case of using a plurality of sets of forming dies adapted to the forming directions of the concentric winding coil (for example, Japanese Patent Application Publication No. 2004-297863 (JP 2004-297863 A)), it is necessary that the concentric winding coil be accurately positioned with respect to each of the sets of forming dies. In the method described in International Publication No. 2014/157218 (WO 2014/157218), however, the curving of the coil end portions and the formation of the offset portions can be performed in a state in which the concentric winding coil is attached to the fin-shaped dies. Thus, it is possible to reduce the operation of attaching the coil to the forming dies.

SUMMARY

In the coil forming method described in International Publication No. 2014/157218 (WO 2014/157218), however, the offset portions are each bent in the stacking direction of the flat rectangular conductor wire, which is substantially orthogonal to the direction in which the concentric winding coil relatively moves, with an offset in the stacking direction while relatively moving (sliding) the fin-shaped dies in the directions in which the fin-shaped dies approach the concentric winding coil. Therefore, when the offset portions are formed, forces are applied to the concentric winding coil (flat rectangular conductor wire) in a direction along the stacking direction of the flat rectangular conductor wire in addition to the relative movement (slide) direction of the concentric winding coil. As a result, an insulating film of the concentric winding coil (flat rectangular conductor wire) may be damaged.

An exemplary aspect of the disclosure provides a method for forming a coil and an apparatus for forming a coil, in which, when a coil is formed (when an offset portion is formed), damage to an insulating film of the coil (flat rectangular conductor wire) can be prevented while reducing an operation of positioning the coil with respect to a die.

A method for forming a coil according to a first aspect of the present disclosure is a method for forming a coil that is formed by winding a flat rectangular conductor wire a plurality of times. The method includes curving a coil end portion of the coil such that an outer die having a plurality of arc-shaped fins arranged so as to have clearances therebetween along a direction in which portions of the flat rectangular conductor wire of the coil are stacked, and divided so as to correspond to one side and the other side of a pair of slot-housed portions of the coil is moved relative to the coil to insert the coil end portion of the coil into the clearances between the fins of the outer die, the coil end portion being curved in conformity to a shape of the fins, and a-step-of forming, in the coil end portion, an offset portion bent in a stacking direction of the flat rectangular conductor wire with an offset in the stacking direction of the flat rectangular conductor wire by an amount corresponding to a width of the single flat rectangular conductor wire by moving the outer die on the one side in the divided outer die relative to the outer die on the other side in a direction along the stacking direction.

As described above, the method for forming a coil according to the first aspect of the present disclosure includes forming, in the coil end portion, the offset portion bent in the stacking direction of the flat rectangular conductor wire with an offset in the stacking direction of the flat rectangular conductor wire by an amount corresponding to the width of the single flat rectangular conductor wire by moving the outer die on the one side in the divided outer die relative to the outer die on the other side in the direction along the stacking direction. Therefore, in forming the offset portion, a force is applied to the coil end portion only in the direction along the stacking direction of the flat rectangular conductor wire. Thus, damage to the insulating film of the coil (flat rectangular conductor wire) can be prevented unlike the case where forces are applied in the direction along the stacking direction of the flat rectangular conductor wire in addition to the relative movement (slide) direction of the coil, namely in the case where the offset portion is formed in the coil end portion while the outer die is relatively moved (slid) in the direction in which the outer die approaches the coil.

Unlike the case where the coil is accurately positioned with respect to each of the sets of forming dies adapted to the forming directions of the coil, the curving of the coil end portion and the formation of the offset portion can be performed in a state in which the coil is attached to the outer die. Therefore, it is possible to reduce the operation of accurately positioning the coil with respect to the die (outer die). As a result, when the coil is formed (when the offset portion is formed), damage to the insulating film of the coil (flat rectangular conductor wire) can be prevented while the operation of positioning the coil with respect to the die (outer die) is reduced.

An apparatus for forming a coil according to a second aspect of the present disclosure is an apparatus for forming a coil, which is configured to form a coil that is formed by winding a flat rectangular conductor wire a plurality of times. The apparatus includes an outer die having a plurality of arc-shaped fins arranged so as to have clearances therebetween along a direction in which portions of the flat rectangular conductor wire of the coil are stacked, and divided so as to correspond to one side and the other side of a pair of slot-housed portions of the coil, a first movement mechanism configured to move the outer die relative to the coil so that a coil end portion of the coil is inserted into the clearances between the fins of the outer die and is curved in conformity to a shape of the fins, and a second movement mechanism configured to move the outer die on the one side in the divided outer die relative to the outer die on the other side in a direction along a stacking direction of the flat rectangular conductor wire so that an offset portion bent in the stacking direction of the flat rectangular conductor wire with an offset in the stacking direction by an amount corresponding to a width of the single flat rectangular conductor wire is formed in the coil end portion.

As described above, the apparatus for forming a coil according to the second aspect of the present disclosure includes the second movement mechanism configured to move the outer die on the one side in the divided outer die relative to the outer die on the other side in the direction along the stacking direction of the flat rectangular conductor wire so that the offset portion bent in the stacking direction of the flat rectangular conductor wire with an offset in the stacking direction by an amount corresponding to the width of the single flat rectangular conductor wire is formed in the coil end portion. Therefore, in forming the offset portion, a force is applied to the coil end portion only in the direction along the stacking direction of the flat rectangular conductor wire. Thus, it is possible to provide an apparatus for forming a coil, in which damage to the insulating film of the coil (flat rectangular conductor wire) can be prevented unlike the case where forces are applied in the direction along the stacking direction of the flat rectangular conductor wire in addition to the relative movement (slide) direction of the coil, namely in the case where the offset portion is formed in the coil end portion while the outer die is relatively moved (slid) in the direction in which the outer die approaches the coil.

Unlike the case where the coil is accurately positioned with respect to each of the sets of forming dies adapted to the forming directions of the coil, the curving of the coil end portion and the formation of the offset portion can be performed in a state in which the coil is attached to the outer die. Therefore, it is possible to reduce the operation of accurately positioning the coil with respect to the die (outer die). As a result, it is possible to provide an apparatus for forming a coil, in which, when the coil is formed (when the offset portion is formed), damage to the insulating film of the coil (flat rectangular conductor wire) can be prevented while the operation of positioning the coil with respect to the die (outer die) is reduced.

According to the present disclosure, as described above, when the coil is formed (when the offset portion is formed), damage to the insulating film of the coil (flat rectangular conductor wire) can be prevented while the operation of positioning the coil with respect to the die is reduced.

BRIEF DESCRIPTION OF THE DRAWINGS

FIG. 20 is a view for describing a step of arranging the inner dies (retreat of the outer dies) according to the embodiment of the present disclosure.

FIG. 21 is a view for describing the step of arranging the inner dies according to the embodiment of the present disclosure.

DETAILED DESCRIPTION OF EMBODIMENTS

An embodiment of the present disclosure is described below with reference to the drawings.

Embodiment (Structure of Concentric Winding Coil)

The structure of a concentric winding coil 10 according to this embodiment is described with reference to FIG. 1 to FIG. 4. Note that the concentric winding coil 10 is an example of a "coil."

Figure 1:
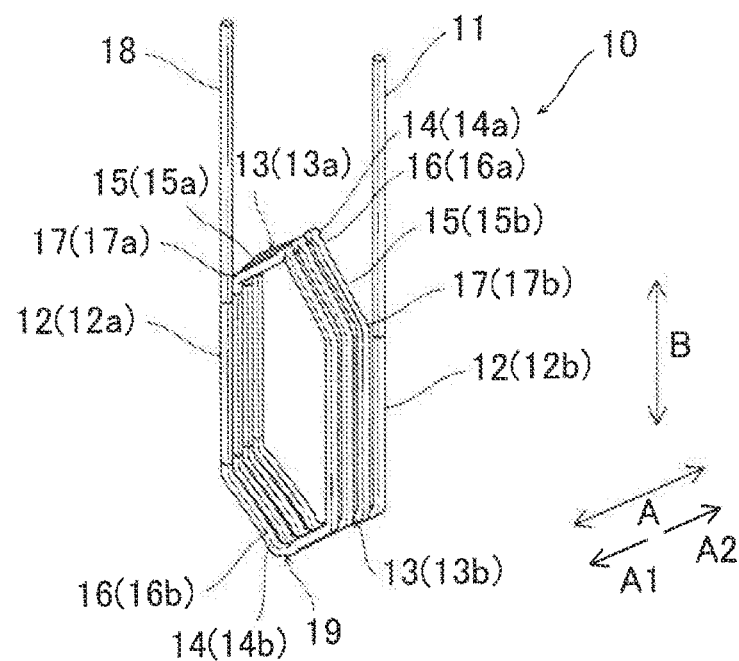
FIG. 1 is a perspective view of a concentric winding coil according to one embodiment of the present disclosure.
Figure 2:
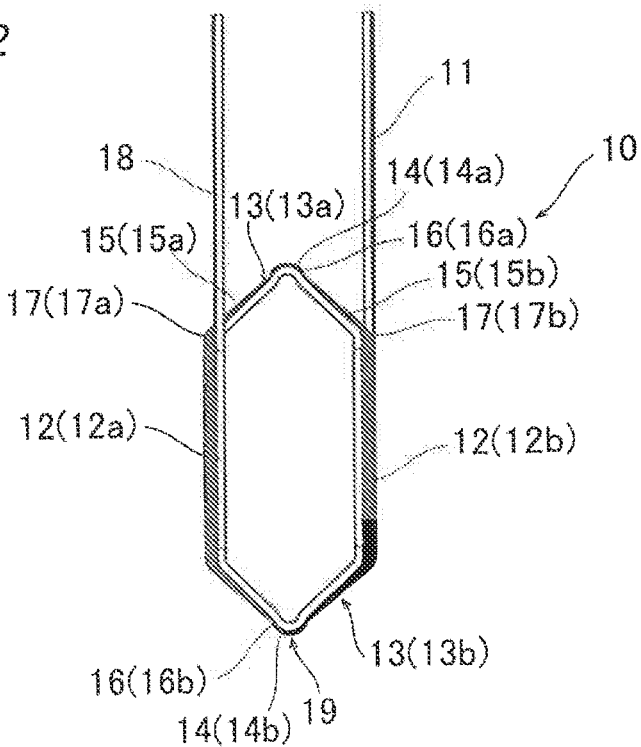
FIG. 2 is a front elevation of the concentric winding coil according to the embodiment of the present disclosure.

As illustrated in FIG. 1 and FIG. 2, the concentric winding coil 10 is formed of a flat rectangular conductor wire 11 having a substantially rectangular shape in cross section. The flat rectangular conductor wire 11 is formed of a metal having a high conductivity (for example, copper or aluminum).

The concentric winding coil 10 is formed of a cassette coil that is formed by winding the flat rectangular conductor wire 11a plurality of times. The concentric winding coil 10 is formed into a predetermined shape (for example, a substantially hexagonal shape) by a forming apparatus 100 described later after a single linear flat rectangular conductor wire 11 is wound a plurality of times by a winding forming apparatus (not illustrated).

The concentric winding coil 10 includes slot-housed portions 12 (slot-housed portions 12a and 12b) and coil end portions 13 (first coil end portion 13a and second coil end portion 13b). The slot-housed portion 12 has a substantially linear shape, and is housed in a slot (not illustrated) of a stator core (not illustrated). The slot-housed portions 12a and 12b are housed in different slots spaced away from each other by a predetermined distance in a circumferential direction of the stator core. The first coil end portion 13a and the second coil end portion 13b are structured to protrude outward from the ends of the stator core in a rotational axis direction, and to connect the slot-housed portions 12a and 12b to each other.

The concentric winding coil 10 is structured such that portions of the flat rectangular conductor wire 11 are stacked in a direction of the short side of the flat rectangular conductor wire 11 in cross section. The stacked portions of the flat rectangular conductor wire 11 are arranged away from each other by a predetermined distance in a stacking direction A (see FIG. 1). The slot-housed portions 12 are formed to expand in a direction from a radially inner side (A1 direction side; see FIG. 1, FIG. 3, and FIG. 4) to a radially outer side (A2 direction side; see FIG. 1, FIG. 3, and FIG. 4) so that the distance between the slot-housed portion 12a and the slot-housed portion 12b along the circumferential direction changes in the stacking direction A. Thus, the concentric winding coil 10 can smoothly be inserted into the slots.

Figure 3:
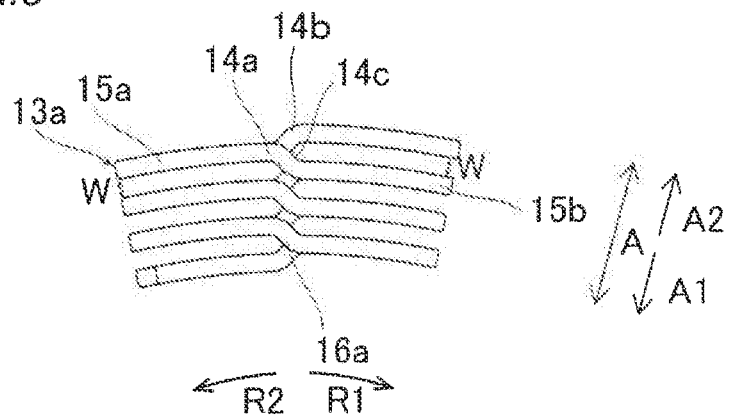
FIG. 3 is a top view of a first coil end portion of the concentric winding coil according to the embodiment of the present disclosure.
Figure 4:
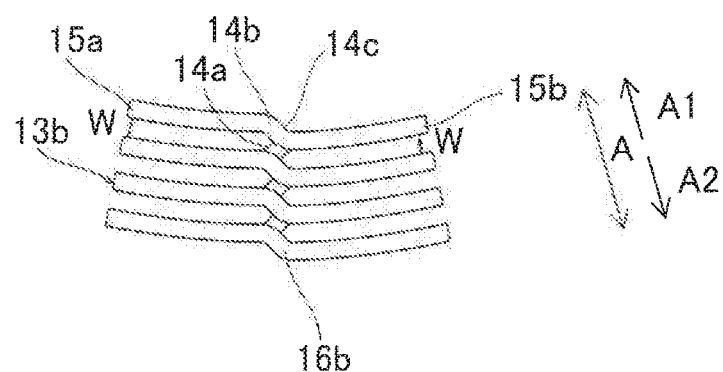
FIG. 4 is a bottom view of a second coil end portion of the concentric winding coil according to the embodiment of the present disclosure.

As illustrated in FIG. 3 and FIG. 4, the coil end portions 13 (first coil end portion 13a and second coil end portion 13b) are provided with offset portions 14 (first offset portion 14a and second offset portion 14b) bent in the stacking direction A of the flat rectangular conductor wire 11 with an offset in the stacking direction A by an amount corresponding to a width W of the single flat rectangular conductor wire 11. As illustrated in FIG. 3, the offset directions of the first offset portion 14a and the second offset portion 14b are opposite to each other. Specifically, when viewed from the top of the concentric winding coil 10, the first offset portion 14a is offset to an outer peripheral side of the concentric winding coil 10 by an amount corresponding to the width W of the single flat rectangular conductor wire 11 in a direction from one circumferential side (R1 direction side) to the other circumferential side (R2 direction side). When viewed from the top of the concentric winding coil 10, the second offset portion 14b is offset to the outer peripheral side of the concentric winding coil 10 by an amount corresponding to the width W of the single flat rectangular conductor wire 11 in a direction from one circumferential side (R2 direction side) to the other circumferential side (R1 direction side).

The offset portion 14 is bent and rounded (that is, not bent at a right angle). The offset portion 14 includes an inclined portion 14c that is inclined with respect to the stacking direction A of the flat rectangular conductor wire 11.

The coil end portion 13 includes a first curved portion 15a that is curved into a circular arc shape in conformity to a circular arc of the annular stator core, and a second curved portion 15b that is arranged with a shift from the first curved portion 15a in the stacking direction A by an amount corresponding to the width W of the single flat rectangular conductor wire 11. The first curved portion 15a and the second curved portion 15b are connected to each other by the offset portion 14.

As illustrated in FIG. 1 and FIG. 2, the coil end portions 13 (first coil end portion 13a and second coil end portion 13b) are provided with protruding portions 16 (protruding portions 16a and 16b) that protrude in a direction in which the slot-housed portion 12 extends (B direction). The offset portion 14 is arranged at the distal end of the protruding portion 16. The concentric winding coil 10 is provided with shoulder portions 17 (17a and 17b) that connect the first curved portion 15a and the slot-housed portion 12 to each other and the second curved portion 15b and the slot-housed portion 12 to each other.

The flat rectangular conductor wire 11 is coated with an unillustrated insulating film.

(Structure of Apparatus for Forming Concentric Winding Coil)

Next, the structure of the forming apparatus 100 for the concentric winding coil 10 is described with reference to FIG. 5 to FIG. 13. The forming apparatus 100 for the concentric winding coil 10 is structured to form the concentric winding coil 10 that is formed by winding the flat rectangular conductor wire 11a plurality of times.

Figure 5:
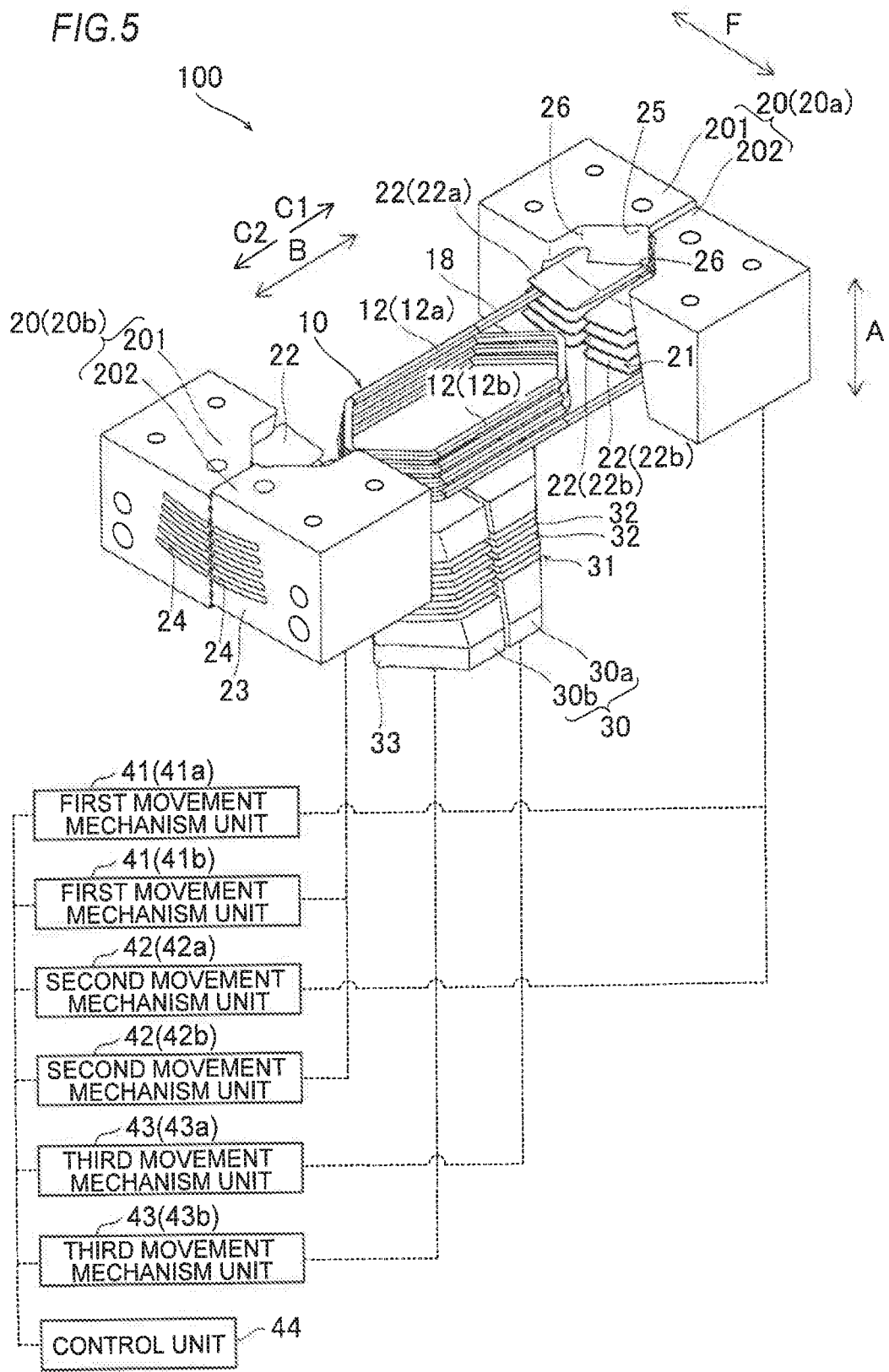
FIG. 5 is a perspective view of an apparatus for forming the concentric winding coil according to the embodiment of the present disclosure.
Figure 6:
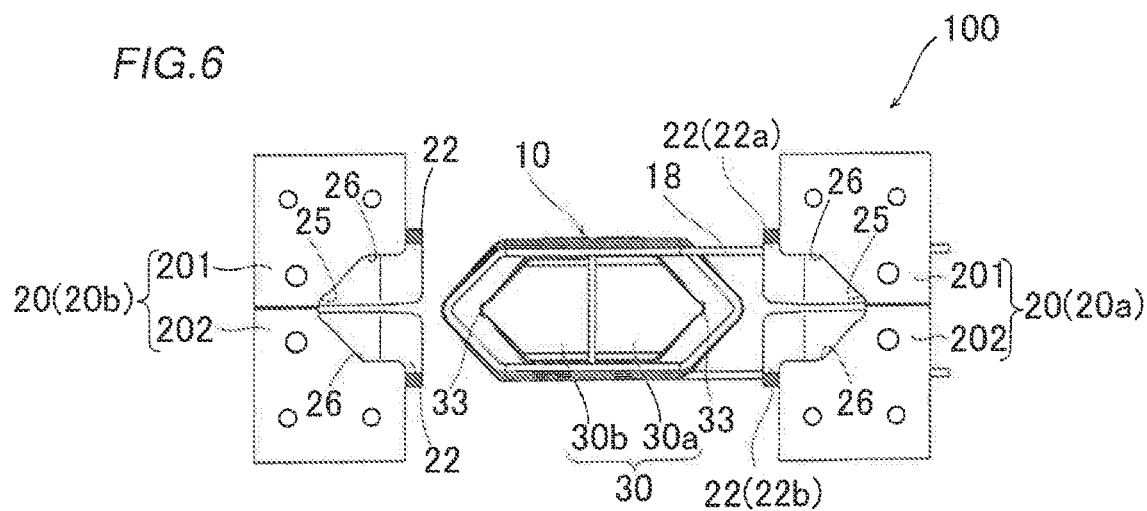
FIG. 6 is a top view of the apparatus for forming the concentric winding coil according to the embodiment of the present disclosure.

As illustrated in FIG. 5 and FIG. 6, the forming apparatus 100 for the concentric winding coil 10 includes outer dies 20. The outer die 20 has a plurality of arc-shaped (circular arc-shaped) fins 22. The fins 22 are arranged so as to have clearances 21 therebetween along the direction A in which the portions of the flat rectangular conductor wire 11 of the concentric winding coil 10 are stacked. The outer die 20 is divided in an F direction into an outer die 201 and an outer die 202 so as to correspond to one side and the other side of the pair of slot-housed portions 12 of the concentric winding coil 10. The inner side of the fin 22 in the F direction is rounded in order not to damage the concentric winding coil 10.

Figure 7:
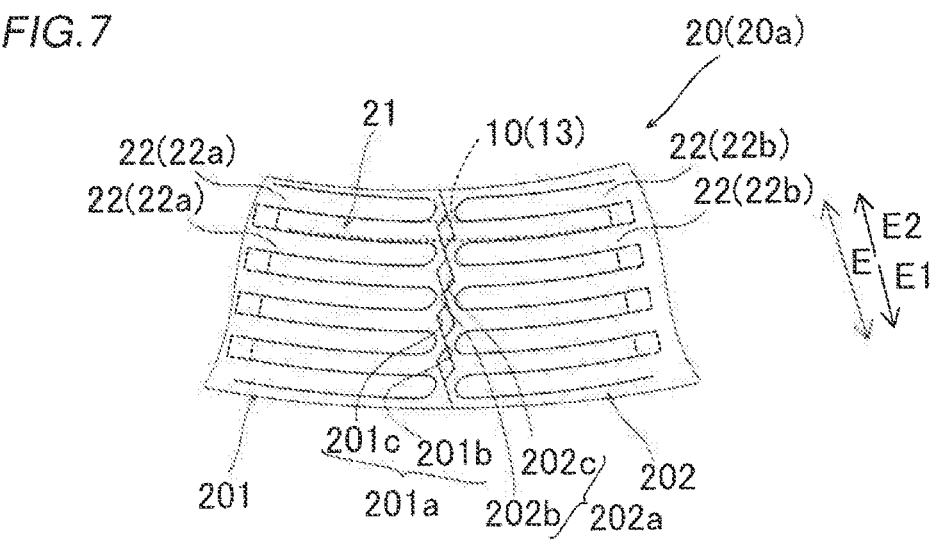
FIG. 7 is a front elevation of fins of the apparatus for forming the concentric winding coil according to the embodiment of the present disclosure.

Each of the fins 22 is formed into a circular arc shape in conformity to the circular arc of the annular stator core (not illustrated) on which the concentric winding coil 10 is arranged. The fins 22 are provided on the divided outer die 20 (outer die 201 and outer die 202). As illustrated in FIG. 7, in a state before the coil end portions 13 of the concentric winding coil 10 are formed, a plurality of fins 22a of the outer die 201 on one side of the slot-housed portions 12 and a plurality of fins 22b of the outer die 202 on the other side of the slot-housed portions 12 are arranged at substantially the same height positions in the stacking direction A of the flat rectangular conductor wire 11 when viewed from a side (side where the concentric winding coil 10 is arranged with respect to the outer die 20) opposite to a direction in which the concentric winding coil 10 is inserted into the outer die 20 (C1 direction or C2 direction; see FIG. 5). Specifically, the height positions at which the fins 22a are attached to the outer die 201 (height positions in the stacking direction A of the flat rectangular conductor wire 11) and the height positions at which the fins 22b are attached to the outer die 202 are different from each other. The outer die 201 and the outer die 202 are arranged so as to be shifted from each other along the stacking direction A of the flat rectangular conductor wire 11 (see FIG. 8 and FIG. 9). In this manner, the distal ends of the fins 22a of the outer die 201 on one side of the slot-housed portions 12 and the distal ends of the fins 22b of the outer die 202 on the other side of the slot-housed portions 12 are arranged at substantially the same height positions. Further, the clearances 21 between the arc-shaped fins 22 have an arc shape in conformity to the arc-shaped fins 22.

Figure 8:
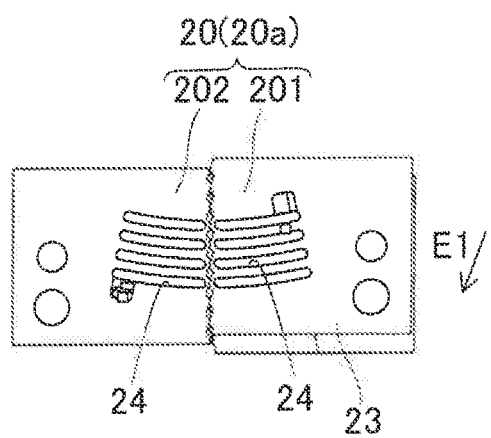
FIG. 8 is a rear elevation of a first outer die of the forming apparatus according to the embodiment of the present disclosure.
Figure 9:
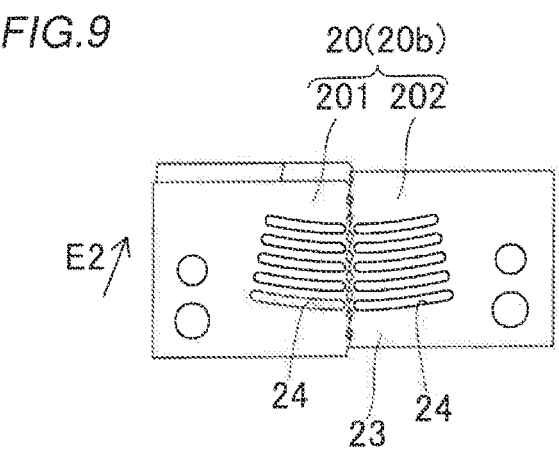
FIG. 9 is a rear elevation of a second outer die of the forming apparatus according to the embodiment of the present disclosure.

As illustrated in FIG. 8 and FIG. 9, a plurality of arc-shaped openings 24 is provided on a surface 23 of each of the outer dies 20 (outer die 201 and outer die 202) on a rear side (side opposite to the side where the concentric winding coil 10 is arranged) so as to communicate with the clearances 21 between the fins 22.

As illustrated in FIG. 5 and FIG. 6, the outer dies 20 include a first outer die 20a provided on the first coil end portion 13a side, and a second outer die 20b provided on the second coil end portion 13b side. As illustrated in FIG. 8, in the first outer die 20a, the outer die 201 is arranged such that the outer die 201 is shifted upward from the outer die 202. As illustrated in FIG. 9, in the second outer die 20b, the outer die 201 is arranged such that the outer die 201 is shifted downward from the outer die 202. Thus, in both of the first outer die 20a and the second outer die 20b, the fins 22a of the outer die 201 on one side of the slot-housed portions 12 and the fins 22b of the outer die 202 on the other side of the slot-housed portions 12 are arranged at substantially the same height positions.

As illustrated in FIG. 5 and FIG. 6, the outer die 20 is provided with a recessed portion 25 that is recessed in the direction in which the slot-housed portion 12 of the concentric winding coil 10 extends (B direction). The recessed portion 25 of the outer die 20 has a shape conforming to the shape of the protruding portion 16 of the concentric winding coil 10. Further, wall portions 26 having a shape conforming to the shape of the shoulder portions 17 of the concentric winding coil 10 are provided on both sides of the recessed portion 25 of the outer die 20.

Figure 10:
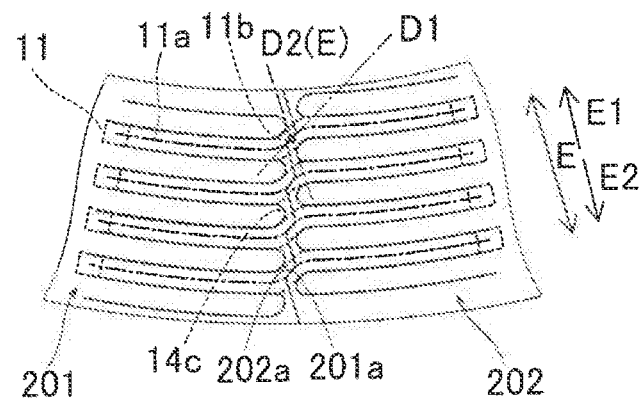
FIG. 10 is a view illustrating a state in which an outer die on one side and an outer die on the other side of the forming apparatus engage with each other according to the embodiment of the present disclosure.
Figure 11:
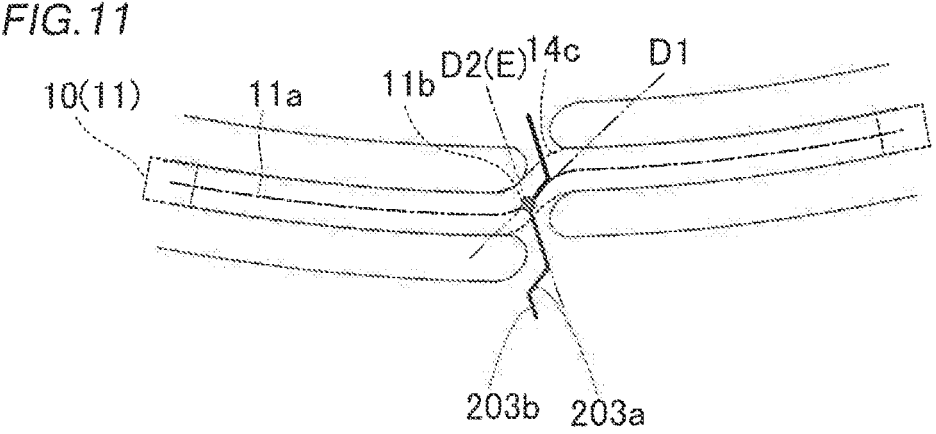
FIG. 11 is a partially enlarged view of FIG. 10.

As illustrated in FIG. 7, surfaces 201a and 202a on which the outer die 201 on one side of the slot-housed portions 12 and the outer die 202 on the other side of the slot-housed portions 12 face each other are each provided with engageable protruding portions 201b and engageable recessed portions 201c (engageable protruding portions 202b and engageable recessed portions 202c). As illustrated in FIG. 10 and FIG. 11 (state in which the protrusions and the recesses engage with each other), the surfaces 201a and 202a on which the protruding portions 201b and the recessed portions 202c (protruding portions 202b and recessed portions 201c) engage with each other are provided along the inclination of the offset portion 14 (inclined portion 14c) in plan view. Specifically, the surfaces 201a and 202a on which the protruding portions 201b and the recessed portions 202c (protruding portions 202b and recessed portions 201c) engage with each other are structured along a line segment D1 in contact with an inflection point 11b on a center line 11a of the flat rectangular conductor wire 11, at which the direction of the curve of the center line 11a changes. More specifically, as illustrated in FIG. 11, each of the engaging surfaces 201a and 202a includes a surface 203a along the line segment D1, and a surface 203b along a line segment D2 that intersects the line segment D1.

Figure 12:
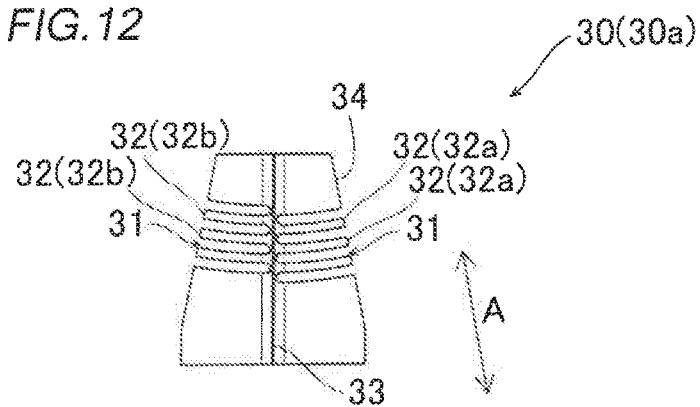
FIG. 12 is a front elevation of a first inner die of the forming apparatus according to the embodiment of the present disclosure.
Figure 13:
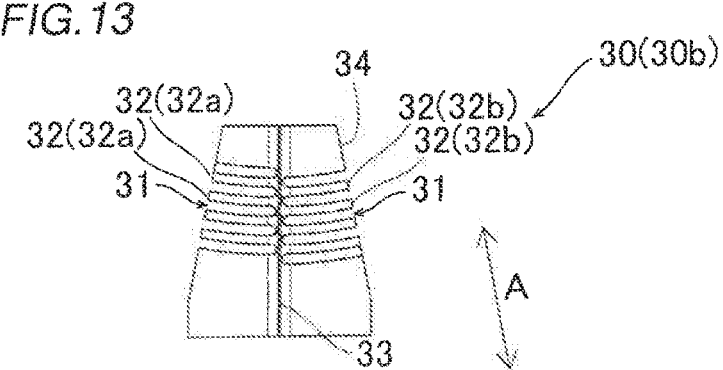
FIG. 13 is a front elevation of a second inner die of the forming apparatus according to the embodiment of the present disclosure.

As illustrated in FIG. 5 and FIG. 6, the forming apparatus 100 for the concentric winding coil 10 includes inner dies 30. The inner die 30 has a plurality of fins 32. The fins 32 are arranged so as to have clearances 31 therebetween along the direction A in which the portions of the flat rectangular conductor wire 11 of the concentric winding coil 10 are stacked. As illustrated in FIG. 12 and FIG. 13, each of the fins 32 is formed into a circular arc shape in conformity to the circular arc of the annular stator core (not illustrated) on which the concentric winding coil 10 is arranged.

The fins 32 are provided so as to correspond to one side and the other side of the pair of slot-housed portions 12 of the concentric winding coil 10. Specifically, as illustrated in FIG. 12 and FIG. 13, the fins 32 include fins 32a corresponding to the divided outer die 201, and fins 32b corresponding to the divided outer die 202. The fins 32a and the fins 32b are arranged so as to be shifted from each other along the stacking direction A of the flat rectangular conductor wire 11. Specifically, the fins 32a and the fins 32b are arranged so as to be shifted (offset) from each other in the stacking direction A of the flat rectangular conductor wire 11 in conformity to the shape of the offset portion 14 of the coil end portion 13.

As illustrated in FIG. 12 and FIG. 13, the inner dies 30 include a first inner die 30a provided on the first coil end portion 13a side, and a second inner die 30b provided on the second coil end portion 13b side. As illustrated in FIG. 12, in the first inner die 30a, the fins 32a are arranged such that the fins 32a are shifted downward from the fins 32b. As illustrated in FIG. 13, in the second inner die 30b, the fins 32a are arranged such that the fins 32a are shifted upward from the fins 32b.

The inner die 30 is provided with a protruding portion 33 that protrudes in the B direction in which the slot-housed portion 12 of the concentric winding coil 10 extends. The protruding portion 33 of the inner die 30 has a shape conforming to the shape of the protruding portion 16 of the concentric winding coil 10.

As illustrated in FIG. 5, the forming apparatus 100 for the concentric winding coil 10 includes first movement mechanism units 41 each including an unillustrated drive source such as a motor or a hydraulic pressure. The first movement mechanism unit 41 is structured to move the outer die 20 relative to the concentric winding coil 10 so that the coil end portion 13 of the concentric winding coil 10 is inserted into the clearances 21 between the fins 22 of the outer die 20 and is curved in conformity to the shape of the fins 22. Specifically, the first movement mechanism unit 41 moves the outer die 20 so that the outer die 20 approaches the concentric winding coil 10 (in the C1 direction or the C2 direction). Therefore, the concentric winding coil 10 is inserted into the clearances 21 between the fins 22, and the coil end portion 13 of the concentric winding coil 10 is curved into a circular arc shape in conformity to the circular arc-shaped fins 22. The first movement mechanism units 41 include a first movement mechanism unit 41a configured to move the first outer die 20a relative to the concentric winding coil 10, and a first movement mechanism unit 41b configured to move the second outer die 20b relative to the concentric winding coil 10.

In this embodiment, the forming apparatus 100 for the concentric winding coil 10 includes second movement mechanism units 42 each including an unillustrated drive source such as a motor or a hydraulic pressure. The second movement mechanism unit 42 is structured to move the outer die 201 on one side of the slot-housed portions 12 in the divided outer die 20 relative to the outer die 202 on the other side of the slot-housed portions 12 in an E direction (see FIG. 7) along the stacking direction A of the flat rectangular conductor wire 11 so that the offset portion 14 bent in the stacking direction A of the flat rectangular conductor wire 11 with an offset in the stacking direction A by an amount corresponding to the width W of the single flat rectangular conductor wire 11 is formed in the coil end portion 13. Specifically, the second movement mechanism unit 42 is structured to move the outer die 201 relative to the outer die 202 in a direction that intersects the inclination of the offset portion 14 (inclined portion 14c). Specifically, as illustrated in FIG. 10 and FIG. 11, the second movement mechanism unit 42 is structured to move the outer die 201 relative to the outer die 202 in a direction along a line segment E (E direction) that intersects the line segment D1 in contact with the inflection point lib on the center line 11a of the flat rectangular conductor wire 11. The line segment E corresponds to a direction along the surface 203b (line segment D2).

The second movement mechanism units 42 include a second movement mechanism unit 42a configured to move the outer die 201 of the first outer die 20a relative to the outer die 202, and a second movement mechanism unit 42b configured to move the outer die 201 of the second outer die 20b relative to the outer die 202. The second movement mechanism unit 42a is structured to move the outer die 201 relative to the outer die 202 in a direction that intersects the line segment D1 (E1 direction; see FIG. 8) in contact with the inflection point lib on the center line 11a of the flat rectangular conductor wire 11. The second movement mechanism unit 42b is structured to move the outer die 201 relative to the outer die 202 in an E2 direction (see FIG. 9) opposite to the E1 direction. Thus, the outer die 201 and the outer die 202 are moved from a state in which the protruding portions 201b (protruding portions 202b) and the recessed portions 202c (recessed portions 201c) do not engage with each other to a state in which the protruding portions 201b (protruding portions 202b) and the recessed portions 202c (recessed portions 201c) engage with each other (see FIG. 18 and FIG. 19). Note that the E1 direction and the E2 direction are examples of a "first direction" and a "second direction," respectively.

The forming apparatus 100 for the concentric winding coil 10 includes third movement mechanism units 43 each including an unillustrated drive source such as a motor or a hydraulic pressure. The third movement mechanism unit 43 is structured to move the inner die 30 relative to the outer die 20 so that the inner die 30 presses the concentric winding coil 10 against the outer die 20 to deform a vertex portion 19 of the coil end portion 13. The third movement mechanism units 43 include a third movement mechanism unit 43a configured to move the first inner die 30a, and a third movement mechanism unit 43b configured to move the second inner die 30b. Further, the forming apparatus 100 includes a control unit 44 configured to control the first movement mechanism units 41, the second movement mechanism units 42, and the third movement mechanism units 43.

(Effects of Structure of Embodiment)

In this embodiment, the following effects can be attained.

As described above, this embodiment provides the second movement mechanism unit 42 configured to move the outer die 201 on one side of the slot-housed portions 12 in the divided outer die 20 relative to the outer die 202 on the other side of the slot-housed portions 12 in the direction (E1 direction or E2 direction) along the stacking direction A of the flat rectangular conductor wire 11 so that the offset portion 14 bent in the stacking direction A of the flat rectangular conductor wire 11 with an offset in the stacking direction A by an amount corresponding to the width W of the single flat rectangular conductor wire 11 is formed in the coil end portion 13. Therefore, in a step of forming the offset portion 14, a force is applied to the coil end portion 13 only in the E direction along the stacking direction A of the flat rectangular conductor wire 11. Thus, damage to the insulating film of the concentric winding coil 10 (flat rectangular conductor wire 11) can be prevented unlike a case where forces are applied in the E direction along the stacking direction A of the flat rectangular conductor wire 11 in addition to the relative movement (slide) direction of the concentric winding coil 10, namely in a case where the offset portion 14 is formed in the coil end portion 13 while the outer die 20 is relatively moved (slid) in the direction in which the outer die 20 approaches the concentric winding coil 10 (C1 direction or C2 direction).

Unlike a case where the concentric winding coil 10 is accurately positioned with respect to each of sets of forming dies adapted to the forming directions of the concentric winding coil 10, the curving of the coil end portion 13 and the formation of the offset portion 14 can be performed in a state in which the concentric winding coil 10 is attached to the outer die 20. Therefore, it is possible to reduce the operation of accurately positioning the concentric winding coil 10 with respect to the die (outer die 20). As a result, when the concentric winding coil 10 is formed (when the offset portion 14 is formed), damage to the insulating film of the concentric winding coil 10 (flat rectangular conductor wire 11) can be prevented while the operation of accurately positioning the concentric winding coil 10 with respect to the die (outer die 20) is reduced.

In this embodiment, as described above, the surfaces 201a and 202a on which the outer die 201 on one side of the slot-housed portions 12 and the outer die 202 on the other side of the slot-housed portions 12 face each other are each provided with the engageable protruding portions 201b and the engageable recessed portions 201c (engageable protruding portions 202b and engageable recessed portions 202c). The surfaces 201a and 202a on which the protruding portions 201b and the recessed portions 202c (protruding portions 202b and recessed portions 201c) engage with each other are provided along the inclination of the offset portion 14 in plan view. Thus, the offset portion 14 can be inclined (the inclined portion 14c can be formed) by moving the outer die 201 on one side of the slot-housed portions 12 and the outer die 202 on the other side of the slot-housed portions 12 so that the protruding portions 201b and the recessed portions 202c (protruding portions 202b and recessed portions 201c) engage with each other.

(Method for Forming Concentric Winding Coil)

Next, a method for forming the concentric winding coil 10 according to this embodiment is described with reference to FIG. 5, FIG. 6, and FIG. 14 to FIG. 23.

<Step of Arranging Concentric Winding Coil>

Figure 14:
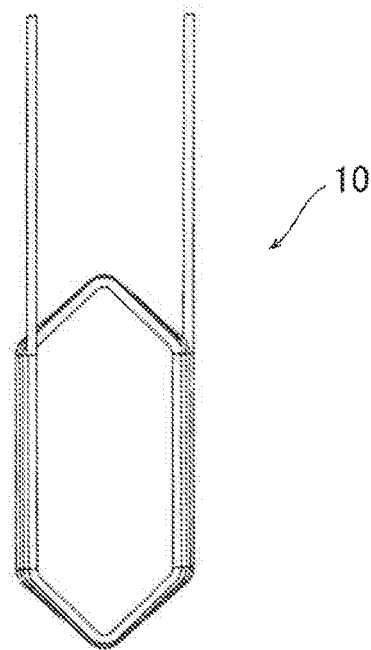
FIG. 14 is a front elevation of a concentric winding coil before forming according to the embodiment of the present disclosure.
Figure 15:
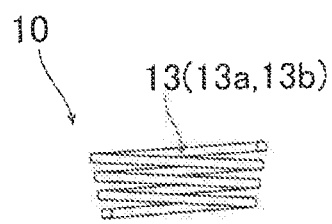
FIG. 15 is a top view of a coil end portion of the concentric winding coil before forming according to the embodiment of the present disclosure.

As illustrated in FIG. 14, a concentric winding coil 10 before forming is prepared. The concentric winding coil 10 before forming is formed into a substantially hexagonal shape by winding the flat rectangular conductor wire 11 a plurality of times. As illustrated in FIG. 15, a coil end portion 13 of the concentric winding coil 10 before forming is not curved (has a substantially linear shape).

Next, as illustrated in FIG. 5 and FIG. 6, the concentric winding coil 10 before forming is arranged between the outer dies 20 (first outer die 20a and second outer die 20b) each having the fins 22 arranged so as to have the clearances 21 therebetween along the A direction in which the portions of the flat rectangular conductor wire 11 are stacked, and divided so as to correspond to one side and the other side of the pair of slot-housed portions 12 of the concentric winding coil 10. When viewed from the side opposite to the direction in which the concentric winding coil 10 is inserted into the outer die 20, the fins 22a of the outer die 201 on one side of the slot-housed portions 12 and the fins 22b of the outer die 202 on the other side of the slot-housed portions 12 are arranged at substantially the same height positions in the stacking direction A of the flat rectangular conductor wire 11 (see FIG. 7). The inner dies 30 are arranged below the concentric winding coil 10.

<Step of Curving Coil End Portions>

Figure 16:
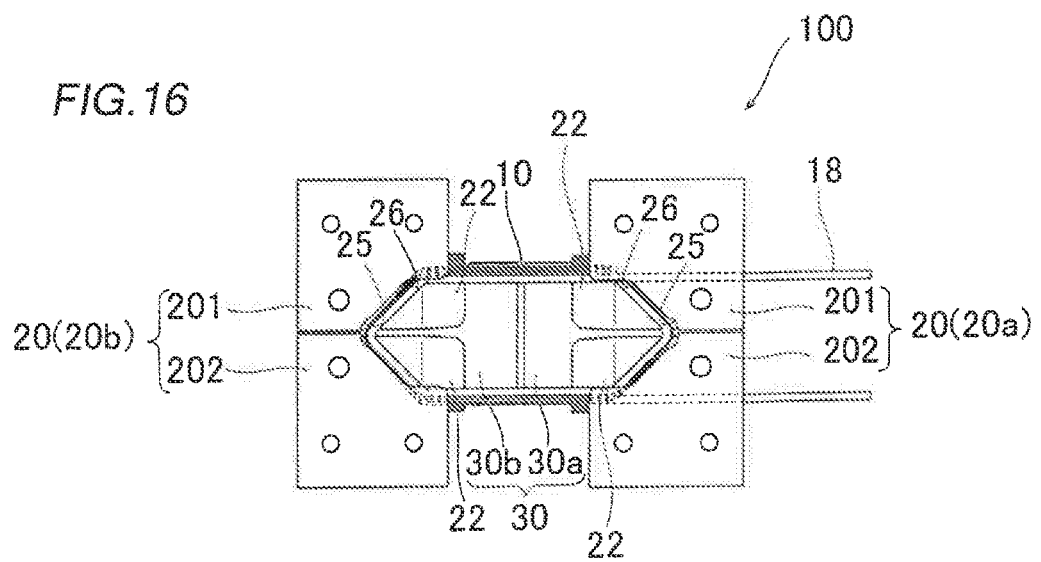
FIG. 16 is a view for describing a step of curving the coil end portion according to the embodiment of the present disclosure.
Figure 17:
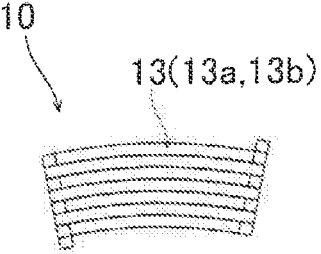
FIG. 17 is a view illustrating the curved coil end portion of the concentric winding coil.

Next, as illustrated in FIG. 16, each of the first movement mechanism units 41 moves the outer die 20 relative to the concentric winding coil 10 to insert the coil end portion 13 of the concentric winding coil 10 into the clearances 21 between the fins 22 of the outer die 20, thereby curving the coil end portion 13 of the concentric winding coil 10 in conformity to the shape of the fins 22. Specifically, each of the coil end portions 13 (first coil end portion 13a and second coil end portion 13b) of the concentric winding coil 10 is gradually curved in conformity to the shape of the fins 22 (see FIG. 17) by sliding relative to the fins 22.

In this embodiment, the coil end portion 13 of the concentric winding coil 10 is curved by inserting the coil end portion 13 of the concentric winding coil 10 into the clearances 21 between the fins 22 of the outer die 20 in the state in which the fins 22a of the outer die 201 on one side of the slot-housed portions 12 and the fins 22b of the outer die 202 on the other side of the slot-housed portions 12 are arranged at substantially the same height positions when viewed from the side opposite to the direction in which the concentric winding coil 10 is inserted into the outer die 20 as illustrated in FIG. 7. That is, a force is applied to the coil end portion 13 mainly in a direction in which the coil end portion 13 is curved, but is not applied in the E direction along the stacking direction A of the flat rectangular conductor wire 11, in which a force is applied to the coil end portion 13 when the offset portion 14 is formed as described later.

The curving of the first coil end portion 13a and the curving of the second coil end portion 13b are performed in parallel by the first outer die 20a and the second outer die 20b, respectively.

<Step of Forming Offset Portions>

Figure 18:
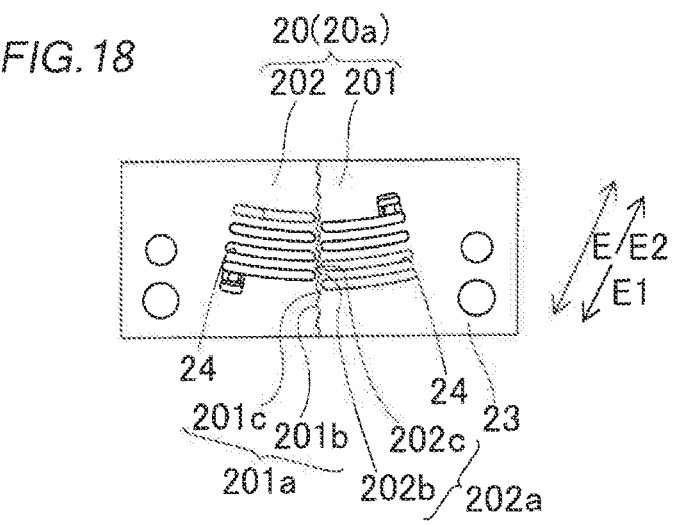
FIG. 18 is a view for describing a step of forming an offset portion (first outer die) according to the embodiment of the present disclosure.
Figure 19:
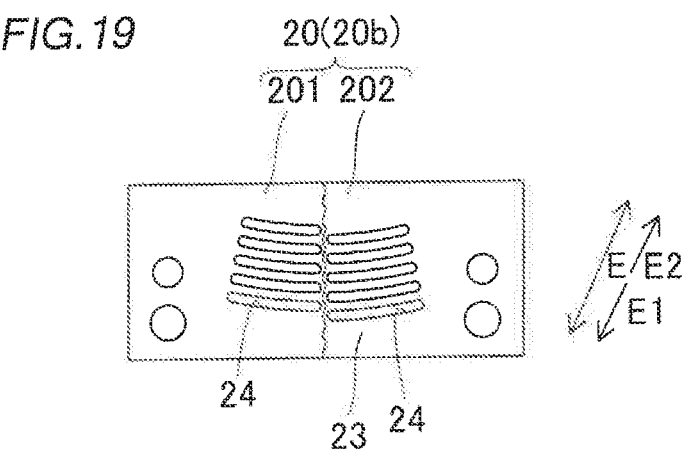
FIG. 19 is a view for describing the step of forming the offset portion (second outer die) according to the embodiment of the present disclosure.

Next, in this embodiment, as illustrated in FIG. 18 and FIG. 19, each of the second movement mechanism units 42 moves the outer die 201 on one side of the slot-housed portions 12 in the divided outer die 20 relative to the outer die 202 on the other side of the slot-housed portions 12 in the direction (E direction) along the stacking direction A of the flat rectangular conductor wire 11, thereby forming, in the coil end portion 13, the offset portion 14 bent in the stacking direction A of the flat rectangular conductor wire 11 with an offset in the stacking direction A by an amount corresponding to the width W of the single flat rectangular conductor wire 11 (see FIG. 3 and FIG. 4). Specifically, the second movement mechanism unit 42 moves the outer die 201 on one side of the slot-housed portions 12 in the divided outer die 20 relative to the outer die 202 on the other side of the slot-housed portions 12 in the direction E (see FIG. 10) that intersects the inclination of the offset portion 14 (inclined portion 14c).

That is, as illustrated in FIG. 3 and FIG. 4, the offset portion 14 bent in the stacking direction A of the flat rectangular conductor wire 11 with an offset in the stacking direction A by an amount corresponding to the width W of the single flat rectangular conductor wire 11 is formed by moving the first curved portion 15a of the coil end portion 13 to one side in the stacking direction A and moving the second curved portion 15b to the other side in the stacking direction A.

Specifically, in this embodiment, as illustrated in FIG. 18, in the first outer die 20a arranged on the first coil end portion 13a side, the first offset portion 14a is formed in the first coil end portion 13a by moving the outer die 201 on one side of the slot-housed portions 12 in the divided first outer die 20a relative to the outer die 202 on the other side of the slot-housed portions 12 in the E1 direction along the stacking direction A of the flat rectangular conductor wire 11. As illustrated in FIG. 19, in the second outer die 20b arranged on the second coil end portion 13b side, the second offset portion 14b that is offset in the direction opposite to that of the first offset portion 14a is formed in the second coil end portion 13b by moving the outer die 201 on one side of the slot-housed portions 12 in the divided second outer die 20b relative to the outer die 202 on the other side of the slot-housed portions 12 in the E2 direction opposite to the E1 direction. Thus, the first offset portion 14a and the second offset portion 14b that are offset in the opposite directions are formed.

In this embodiment, the offset portion 14 is formed by moving the fins 22a of the outer die 201 on one side of the slot-housed portions 12 and the fins 22b of the outer die 202 on the other side of the slot-housed portions 12 so as to be shifted in the E direction along the stacking direction A of the flat rectangular conductor wire 11 (see FIG. 10) from the state in which the fins 22a and the fins 22b are arranged at substantially the same height positions in the stacking direction A of the flat rectangular conductor wire 11 (see FIG. 7). Thus, the outer die 201 and the outer die 202 are moved from the state in which the protruding portions 201b (protruding portions 202b) and the recessed portions 202c (recessed portions 201c) do not engage with each other (see FIG. 8 and FIG. 9) to the state in which the protruding portions 201b (protruding portions 202b) and the recessed portions 202c (recessed portions 201c) engage with each other (see FIG.

18 and FIG. 19). Thus, the first offset portion 14a and the second offset portion 14b are formed.

In this embodiment, the step of forming the first offset portion 14a in the first coil end portion 13a and the step of forming the second offset portion 14b in the second coil end portion 13b are performed in parallel by the first outer die 20a and the second outer die 20b, respectively.

<Step of Arranging Inner Dies>

Next, as illustrated in FIG. 20, the outer dies 20 are retreated away from the concentric winding coil 10 after the offset portions 14 are formed in the coil end portions 13. As illustrated in FIG. 21, the inner dies 30 are arranged on an inner peripheral side of the concentric winding coil 10. The step of arranging the inner dies 30 on the inner peripheral side of the concentric winding coil 10 is performed by the third movement mechanism units 43.

<Step of Forming Protruding Portions>

Figure 22:
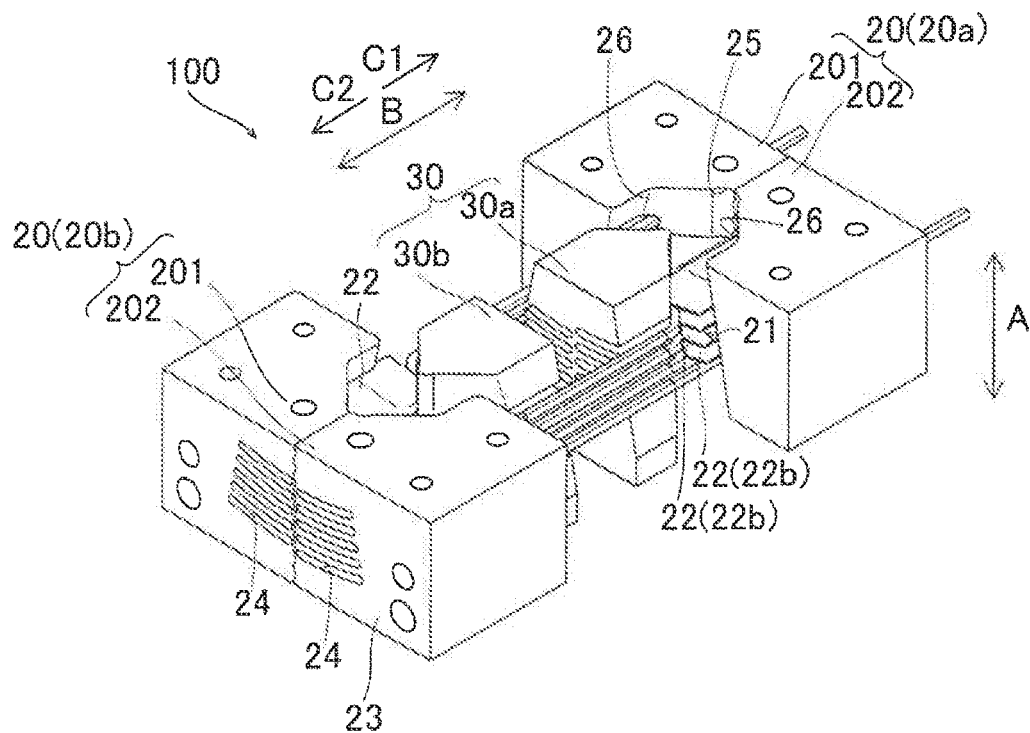
FIG. 22 is a view for describing a step of forming protruding portions (movement of the inner dies) according to the embodiment of the present disclosure.
Figure 23:
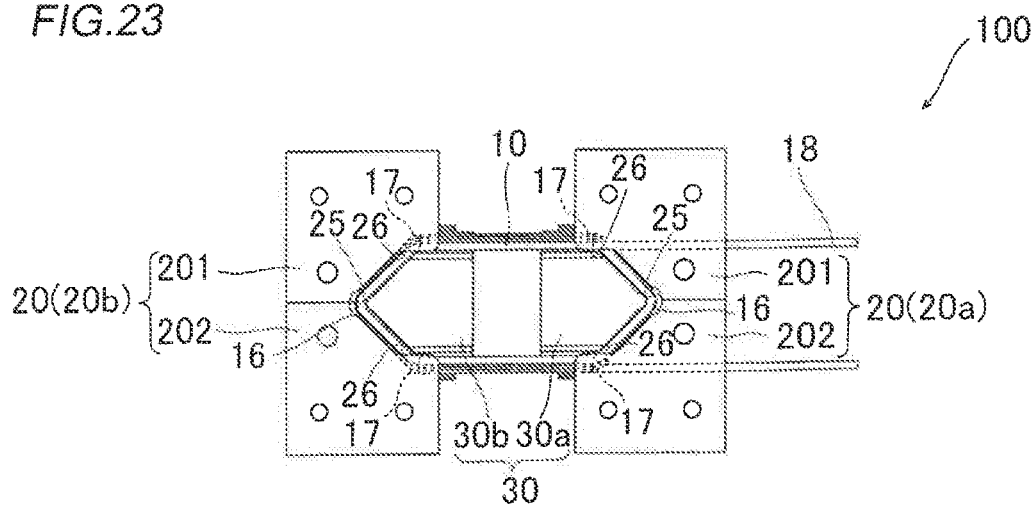
FIG. 23 is a view for describing the step of forming the protruding portions (movement of the outer dies) according to the embodiment of the present disclosure.

Next, in this embodiment, as illustrated in FIG. 22, each of the inner dies 30 is moved relative to the outer die 20. Specifically, the third movement mechanism unit 43 moves the inner die 30 so that the inner die 30 approaches the outer die 20. As illustrated in FIG. 23, the first movement mechanism unit 41 moves the outer die 20 so that the outer die 20 approaches the inner die 30. Thus, the inner die 30 (protruding portion 33) presses the concentric winding coil 10 against the outer die 20 (recessed portion 25) to deform the vertex portion 19 of the coil end portion 13. As a result, the protruding portion 16 (protruding portion 16a or 16b) is formed. Further, the concentric winding coil 10 is pressed against the wall portions 26 of the outer die 20 to form the shoulder portions 17 of the concentric winding coil 10. Further, the slot-housed portions 12 of the concentric winding coil 10 are deformed (formed) in conformity to the shape of clearances between the inner die 30 and the outer die 20. Specifically, the wall portions 26 of the outer die 20 and wall portions 34 of the inner die 30 (see FIG. 12 and FIG. 13) that face the wall portions 26 of the outer die 20 have a tapered shape. Thus, the flat rectangular conductor wire 11 that structures the slot-housed portions 12 of the concentric winding coil 10 is deformed while being gradually shifted toward the outer peripheral side of the concentric winding coil 10 (see FIG. 1).

The formation of the protruding portion 16a and the formation of the protruding portion 16b are performed in parallel by the first inner die 30a and the second inner die 30b, respectively. The formation of the concentric winding coil 10 is thus finished.

(Effects of Manufacturing Method of Embodiment)

In this embodiment, the following effects can be attained.

As described above, this embodiment provides the step of forming, in the coil end portion 13, the offset portion 14 bent in the stacking direction A of the flat rectangular conductor wire 11 with an offset in the stacking direction A of the flat rectangular conductor wire 11 by an amount corresponding to the width W of the single flat rectangular conductor wire 11 by moving the outer die 201 on one side of the slot-housed portions 12 in the divided outer die 20 relative to the outer die 202 on the other side of the slot-housed portions 12 in the E direction along the stacking direction A. Therefore, in the step of forming the offset portion 14, a force is applied to the coil end portion 13 only in the E direction along the stacking direction A of the flat rectangular conductor wire 11. Thus, damage to the insulating film of the concentric winding coil 10 (flat rectangular conductor wire 11) can be prevented unlike the case where forces are applied in the E direction along the stacking direction A of the flat rectangular conductor wire 11 in addition to the relative movement (slide) direction of the concentric winding coil 10 (C1 direction or C2 direction), namely in the case where the offset portion 14 is formed in the coil end portion 13 while the outer die 20 is relatively moved (slid) in the direction in which the outer die 20 approaches the concentric winding coil 10.

Similarly to (the structure of this embodiment), in (the manufacturing method of this embodiment), when the concentric winding coil 10 is formed (when the offset portion 14 is formed), damage to the insulating film of the concentric winding coil 10 (flat rectangular conductor wire 11) can be prevented while the operation of accurately positioning the concentric winding coil 10 with respect to the die (outer die 20) is reduced.

In this embodiment, as described above, the step of forming the offset portion 14 includes the step of forming the first offset portion 14a in the first coil end portion 13a by moving the outer die 201 on one side of the slot-housed portions 12 in the divided outer die 20 relative to the outer die 202 on the other side of the slot-housed portions 12 in the E1 direction along the stacking direction A of the flat rectangular conductor wire 11, and the step of forming the second offset portion 14b, which is offset in the direction opposite to that of the first offset portion 14a, in the second coil end portion 13b by moving the outer die 201 on one side of the slot-housed portions 12 in the divided outer die 20 relative to the outer die 202 on the other side of the slot-housed portions 12 in the E2 direction opposite to the E1 direction. Thus, the first offset portion 14a and the second offset portion 14b whose offset directions are opposite to each other can be formed easily.

In this embodiment, as described above, the step of forming the first offset portion 14a in the first coil end portion 13a and the step of forming the second offset portion 14b in the second coil end portion 13b are performed in parallel by the first outer die 20a and the second outer die 20b, respectively. Thus, the tact time of the steps of forming the first offset portion 14a and the second offset portion 14b can be shortened as compared to a case where the first offset portion 14a and the second offset portion 14b are formed with a temporal shift.

In this embodiment, as described above, the outer die 201 on one side of the slot-housed portions 12 in the divided outer die 20 is moved relative to the outer die 202 on the other side of the slot-housed portions 12 in the E direction that intersects the inclination of the offset portion 14. Thus, the offset portion 14 can be inclined (the inclined portion 14c can be formed) so as to intersect the relative movement direction of the outer die 20.

In this embodiment, as described above, the step of curving the coil end portion 13 includes the step of curving the coil end portion 13 of the concentric winding coil 10 by inserting the coil end portion 13 of the concentric winding coil 10 into the clearances 21 between the fins 22 of the outer die 20 in the state in which the fins 22a of the outer die 201 on one side of the slot-housed portions 12 and the fins 22b of the outer die 202 on the other side of the slot-housed portions 12 are arranged at substantially the same height positions when viewed from the side opposite to the direction in which the concentric winding coil 10 is inserted into the outer die 20. The clearances 21 between the fins 22 communicate with each other between the outer die 20 on one side of the slot-housed portions 12 and the outer die 20 on the other side of the slot-housed portions 12. Thus, the concentric winding coil 10 can easily be inserted into the clearances 21 that communicate with each other.

In this embodiment, as described above, the step of forming the offset portion 14 includes the step of forming the offset portion 14 by moving the fins 22a of the outer die 201 on one side of the slot-housed portions 12 and the fins 22b of the outer die 202 on the other side of the slot-housed portions 12 so as to be shifted in the E direction along the stacking direction A of the flat rectangular conductor wire 11 from the state in which the fins 22a and the fins 22b are arranged at substantially the same height positions. Thus, the offset portion 14 can easily be formed without changing the arrangement position of the concentric winding coil 10 by simply moving the outer die 201 on one side of the slot-housed portions 12 and the outer die 202 on the other side of the slot-housed portions 12 in the E direction along the stacking direction A of the flat rectangular conductor wire 11 after the coil end portion 13 is curved in the state in which the fins 22a of the outer die 201 on one side of the slot-housed portions 12 and the fins 22b of the outer die 202 on the other side of the slot-housed portions 12 are arranged at substantially the same height positions in the stacking direction A of the flat rectangular conductor wire 11.

As described above, this embodiment provides the step of arranging the inner dies 30 on the inner peripheral side of the concentric winding coil 10 after the step of forming the offset portions 14 in the coil end portions 13, and the step of deforming the vertex portions 19 of the coil end portions 13 by moving the inner dies 30 relative to the outer dies 20 such that the inner dies 30 press the concentric winding coil 10 against the outer dies 20. Thus, unlike a case where the step of forming the offset portions 14 in the coil end portions 13 and the step of deforming the vertex portions 19 of the coil end portions 13 are performed in parallel, the insulating film of the concentric winding coil 10 (flat rectangular conductor wire 11) can be prevented from being damaged because forces are applied in the E direction along the stacking direction A of the flat rectangular conductor wire 11 in addition to the relative movement (slide) direction of the concentric winding coil 10 (C1 direction or C2 direction).

Modified Examples

It should be understood that the embodiment disclosed herein is illustrative but is not limitative in all respects.

For example, in the embodiment described above, description is given of the example in which the concentric winding coil that is formed by winding the flat rectangular conductor wire a plurality of times is used. However, the present disclosure is not limited thereto. For example, a coil other than the concentric winding coil that is formed by winding the flat rectangular conductor wire a plurality of times may be used.

In the embodiment described above, description is given of the example in which the formation of the first offset portion and the formation of the second offset portion (the curving of the first coil end portion and the curving of the second coil end portion, and the formation of the protruding portion of the first coil end portion and the formation of the protruding portion of the second coil end portion) are performed in parallel. However, the present disclosure is not limited thereto. For example, the formation of the first offset portion and the formation of the second offset portion (the curving of the first coil end portion and the curving of the second coil end portion, and the formation of the protruding portion of the first coil end portion and the formation of the protruding portion of the second coil end portion) may be performed independently with a temporal shift.

In the embodiment described above, description is given of the example in which the surfaces on which the outer die on one side of the slot-housed portions and the outer die on the other side of the slot-housed portions face each other are each provided with the engageable protruding portions and the engageable recessed portions. However, the present invention-disclosure is not limited thereto. For example, the surfaces on which the outer die on one side of the slot-housed portions and the outer die on the other side of the slot-housed portions face each other may be flat surfaces.

In the embodiment described above, description is given of the example in which the first movement mechanism unit and the third movement mechanism unit respectively move the outer die and the inner die relative to the concentric winding coil in the direction in which the outer die and the inner die approach each other. However, the present disclosure is not limited thereto. For example, the concentric winding coil may be moved in a state in which the outer die and the inner die are fixed.

In the embodiment described above, description is given of the example in which the outer dies (inner dies) are arranged on both of the first coil end portion side and the second coil end portion side of the concentric winding coil. However, the present disclosure is not limited thereto. For example, the concentric winding coil may be formed while the outer die (inner die) is arranged only on one of the first coil end portion side and the second coil end portion side. That is, after the first coil end portion of the concentric winding coil is formed, the second coil end portion of the concentric winding coil may be formed by moving the outer die (inner die) that forms the first coil end portion.

In the embodiment described above, description is given of the example in which the inner die is not divided unlike the outer die. However, the present disclosure is not limited thereto. For example, the inner die may be divided so as to correspond to one side and the other side of the pair of slot-housed portions of the concentric winding coil similarly to the outer die.

The invention claimed is:

1. A method for forming a coil comprised of portions of a flat rectangular conductor wire that are previously stacked, the method comprising:

inserting a coil end portion of the coil into a first outer die and a second outer die, the first outer die and the second outer die each having a plurality of arc-shaped fins arranged so as to have clearances therebetween along a direction in which the portions of the flat rectangular conductor wire of the coil are previously stacked, and the first outer die and the second outer die correspond to one side and the opposite side of a pair of slot-housed portions of the coil;

curving the coil end portion of the coil by moving at least one of the first outer die and the second outer die relative to the coil to insert the coil end portion of the coil into the clearances between the fins of the first outer die and the second outer die, the coil end portion being curved in conformity to a shape of the fins; and forming, in the coil end portion, an offset portion bent in a stacking direction of the flat rectangular conductor wire with an offset in the stacking direction of the flat rectangular conductor wire by an amount corresponding to a width of the single flat rectangular conductor wire by moving the first outer die relative to the second outer die in a direction along the stacking direction.

2. The method according to claim 1, wherein
the coil end portion includes a first coil end portion provided on one side of the coil, and a second coil end portion provided on the opposite side of the coil,
the first outer die is provided on a first coil end portion side, and the second outer die is provided on a second coil end portion side, and
forming the offset portion includes forming a first offset portion in the first coil end portion by moving the first outer die relative to the second outer die in a first direction along the stacking direction of the flat rectangular conductor wire, and forming a second offset portion, which is offset in a second direction opposite to the first direction of the first offset portion, in the second coil end portion by moving the first outer die relative to the second outer die in the second direction opposite to the first direction.

3. The method according to claim 2, wherein forming the first offset portion in the first coil end portion and forming the second offset portion in the second coil end portion are performed in parallel by the first outer die and the second outer die, respectively.

4. The method according to claim 3, wherein the direction in which the first outer die is moved relative to second outer die is a direction that intersects inclination of the offset portion.

5. The method according to claim 4, wherein curving the coil end portion includes curving the coil end portion of the coil by inserting the coil end portion of the coil into the clearances between the fins of the first outer die and the second outer die in a state in which the fins of the first outer die and the fins of the second die are arranged at substantially the same height positions in the stacking direction of the flat rectangular conductor wire when viewed from a side opposite to a direction in which the coil is inserted into the first outer die and the second outer die.

6. The method according to claim 5, further comprising:
arranging an inner die on an inner peripheral side of the coil after forming the offset portion in the coil end portion; and
deforming a vertex portion of the coil end portion by moving the inner die relative to the first outer die such that the inner die presses the coil against the first outer die.

7. The method according to claim 1, wherein the direction in which the first outer die is moved relative to the second outer die is a direction that intersects inclination of the offset portion.

8. The method according to claim 7, wherein curving the coil end portion includes curving the coil end portion of the coil by inserting the coil end portion of the coil into the clearances between the fins of the first outer die and the second outer die in a state in which the fins of the first outer die and the fins of the second outer die are arranged at substantially the same height positions in the stacking direction of the flat rectangular conductor wire when viewed from a side opposite to a direction in which the coil is inserted into the first outer die and the second outer die.

9. The method according to claim 8, further comprising:
arranging an inner die on an inner peripheral side of the coil after forming the offset portion in the coil end portion; and
deforming a vertex portion of the coil end portion by moving the inner die relative to the first outer die such that the inner die presses the coil against the first outer die.

10. The method according to claim 1, wherein curving the coil end portion includes curving the coil end portion of the coil by inserting the coil end portion of the coil into the clearances between the fins of the first outer die and the second outer die in a state in which the fins of the first outer die and the fins of the second outer die are arranged at substantially the same height positions in the stacking direction of the flat rectangular conductor wire when viewed from a side opposite to a direction in which the coil is inserted into the first outer die and the second outer die.

11. The method according to claim 10, further comprising:
arranging an inner die on an inner peripheral side of the coil after forming the offset portion in the coil end portion; and
deforming a vertex portion of the coil end portion by moving the inner die relative to the first outer die such that the inner die presses the coil against the first outer die.

12. The method according to claim 1, further comprising:
arranging an inner die on an inner peripheral side of the coil after forming the offset portion in the coil end portion; and
deforming a vertex portion of the coil end portion by moving the inner die relative to the first outer die such that the inner die presses the coil against the first outer die.

* * * * *